Aug. 29, 1933. A. M. FLANDERS ET AL 1,924,775
ELECTRIC MOTOR CONTROLLING MEANS
Filed May 19, 1932 4 Sheets-Sheet 1

Witness
H. Woodard

Inventor
Allen M. Flanders
Joseph T. Dessureau
By H.B.Wilson & Co
Attorneys.

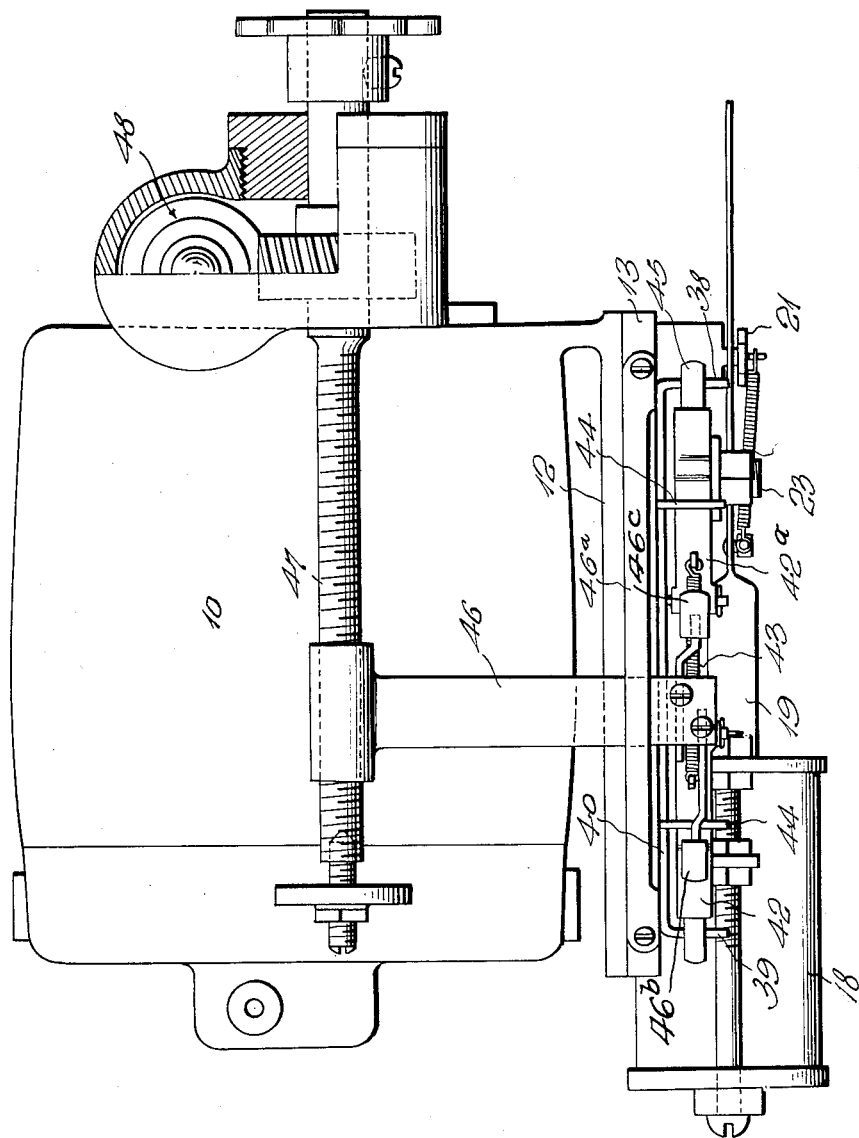

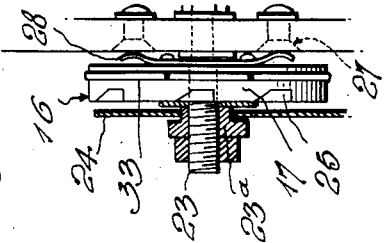
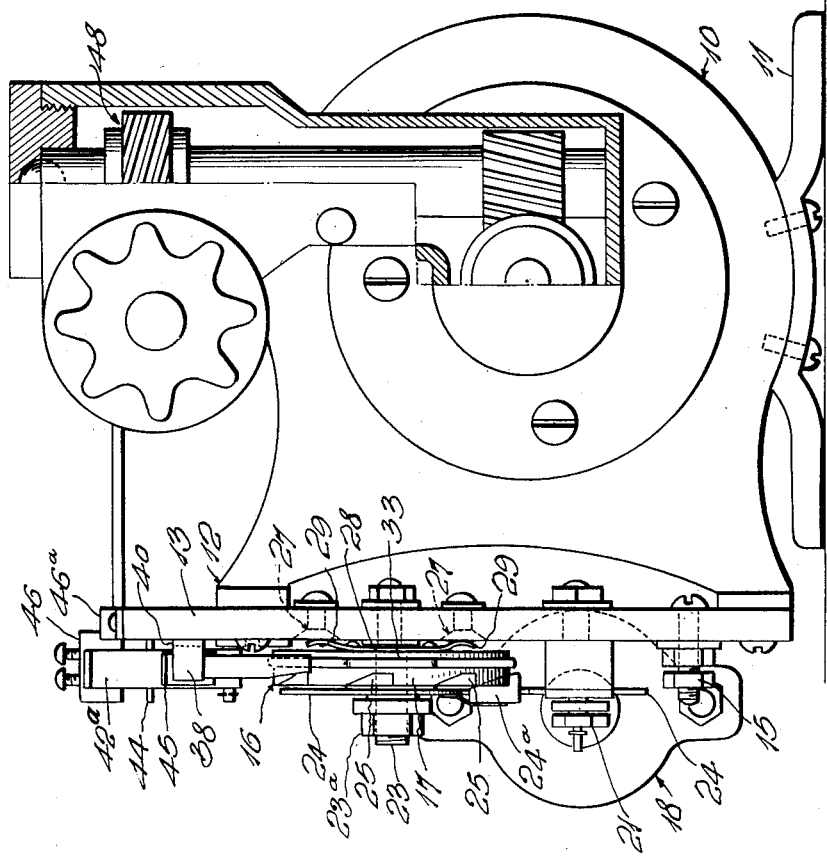

Aug. 29, 1933.  A. M. FLANDERS ET AL  1,924,775
ELECTRIC MOTOR CONTROLLING MEANS
Filed May 19, 1932   4 Sheets-Sheet 4
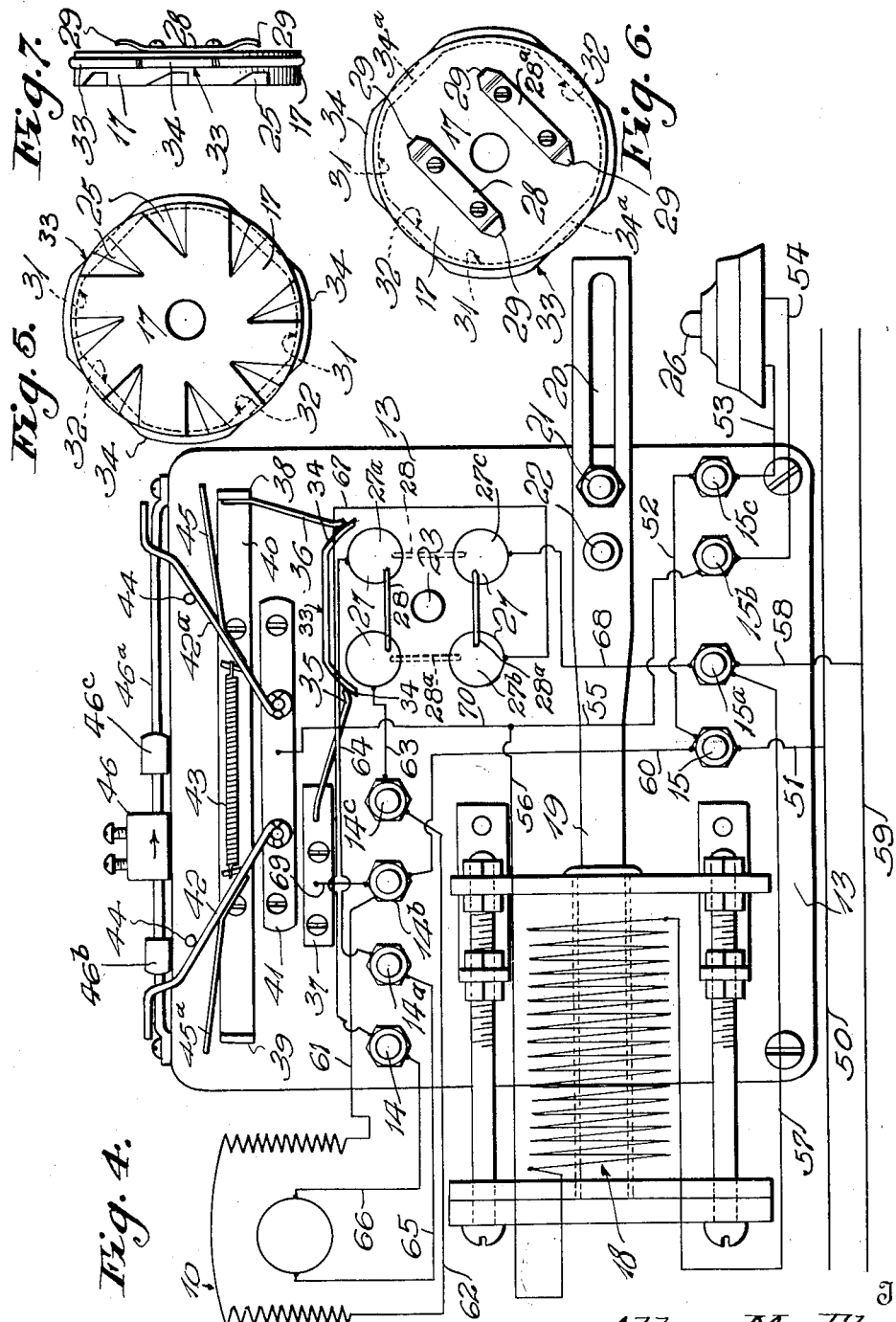
Inventor
Allen M. Flanders
Joseph T. Dessureau
Witness
H. Woodard
By 
Attorneys.

Patented Aug. 29, 1933

1,924,775

UNITED STATES PATENT OFFICE 1,924,775

ELECTRIC MOTOR-CONTROLLING MEANS

Allen M. Flanders and Joseph T. Dessureau, Barre, Vt.

Application May 19, 1932. Serial No. 612,318

1 Claim. (Cl. 172—239)

The invention aims to provide a new and improved means for so controlling an electric motor as to start the latter in one direction whenever desired, rotate it in said direction for a predetermined time, stop the motor at the expiration of said time, reversely start it when desired, and again bring the motor to a stop when it has been reversely driven for the same period as above mentioned. While the invention is intended primarily for controlling electric motors used for raising and lowering awnings, it is not restricted to this particular field of use, but is of general application.

To start the motor, a starting switch is closed. This switch energizes a solenoid or other electromagnetic means for moving a motor switch to motor-starting position. As soon as the motor starts, a traveling limit switch controller which is driven by said motor, starts to travel in one direction, and when said limit switch controller has moved a predetermined extent, it closes one limit switch, again completing the circuit of the solenoid or the like, so that the latter moves the motor switch to open position and the motor comes to rest. When the starting switch is again operated, the motor switch is moved by the solenoid to a motor reversing position, the motor then rotates reversely, and the limit switch controller travels reversely. When this controller has traveled to a predetermined extent, it closes another limit switch, thereby again energizing the solenoid and causing the latter to again move the motor switch to open position, so that the motor stops. Upon again closing the starting switch, the first described operations again take place.

A further object of the invention is to provide additional switch means controlled by the solenoid and included in the circuits controlled by the limit switches, said additional switch means closing when the motor switch closes and opening when the motor switch opens. Thus, each time a limit switch must function to energize the solenoid to move the motor switch to open position, the circuit finally closed by said limit switch passes through the aforesaid additional switch means. As soon as the solenoid moves the motor switch however to open position, said additional switch means is also opened and consequently the solenoid is deenergized so that it may return to its initial position, in readiness for the next operation of the motor switch.

With the foregoing and minor objects in view, the invention resides in the novel subject matter hereinafter described and claimed, description being accomplished by reference to the accompanying drawings.

Fig. 2 is a top plan view partly broken away and in horizontal section.

Fig. 3 is an end elevation showing the right hand end of the assemblage as illustrated in Figs. 1 and 2.

Fig. 4 is primarily a diagram, the rotatable part of the motor controlling switch and portions of the actuating means for said part being removed. In this view, part of the contact ring and the bridges of said removed rotatable switch part, are diagrammatically shown, one operative position of said bridges being shown in full lines and another in dotted lines.

Fig. 5 is an outer side elevation of the rotatable switch member removed from Fig. 4.

Fig. 6 is an inner side elevation of the same switch member.

Fig. 7 is an edge view thereof.

Fig. 8 is a detail vertical sectional view through the motor switch.

Figure 1:
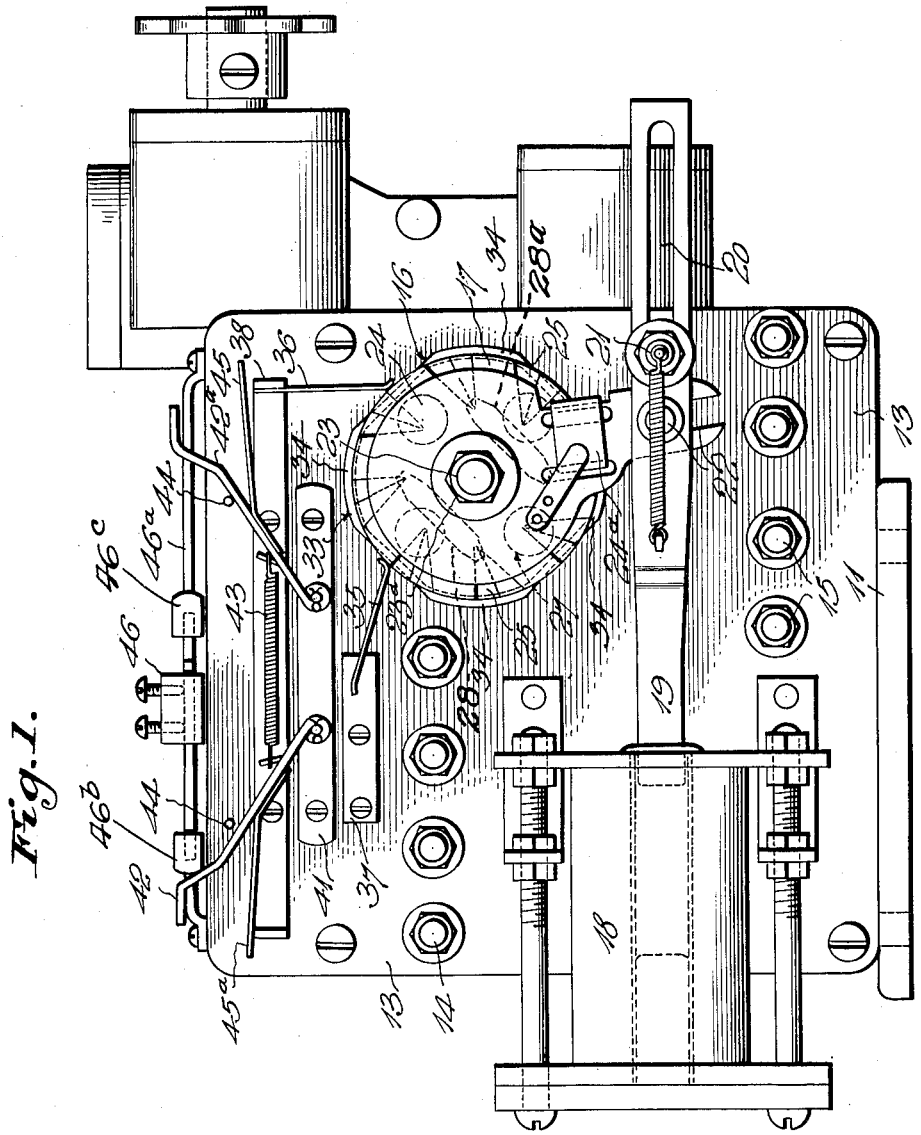
Fig. 1 is a side elevation showing an assemblage of electric motor and controlling means embodying the invention.

A preferred construction has been illustrated and this construction has proven to be highly efficient and advantageous. While it will be herein specifically described, it is to be understood that within the scope of the invention as claimed, numerous variations may be made.

A reversible motor 10 is employed, and with the structure and wiring herein disclosed, any reversible motor with four leads may be used, said motor however being preferably of the universal type, series wound. This motor is provided with a base or the like 11 by means of which it may be secured to an appropriate supporting structure. The motor 10 is also provided with a suitable bracket 12 to which an insulating panel 13, is secured, said panel serving as mounting means for most of the parts of the motor controlling mechanism. The parts 14 and 15 carried by this panel, are merely upper and lower sets of binding posts for the wiring diagrammatically shown in Fig. 4. The other parts mounted on said panel, will be described below.

16 denotes a switch mounted upon the panel 13 for effecting driving of the motor first in one direction, for then stopping said motor, for later effecting motor-driving reversely, and for still later again stopping said motor. This switch 16 includes a rotatable switch member 17 in the form of a fibre wheel or the like, said wheel having eight different positions during the operation of the motor, first in one direction for a predetermined time and then in the other direction for the same time. A solenoid 18 mounted on the panel 13, and ratchet mechanism, jointly forming electro-magnetic operating means, are provided for the wheel 17. In the present showing, the solenoid core 19 is extended and formed with a slot 20 receiving a limit bolt or the like 21, the extended part of the core being pivotally and slidably connected at 22 with an oscillatory lever 24 which is mounted at the outer side of the wheel 17, co-axially with the latter. The wheel 17 is mounted upon a stub-shaft 23 projecting from the panel or base 13 and may be adjusted toward the latter by a nut 23$^a$. Lever 24 is mounted on a reduced part of nut 23$^a$ and carries a spring-pressed pawl 24$^a$ which is co-operable with eight ratchet teeth 25 with which the outer side of the wheel 17 is provided, and each time the solenoid 18 is energized, it swings lever 24 sufficiently to cause the pawl 24$^a$ and the ratchet tooth 25 with which it then co-acts, to turn the wheel 17 one-eighth of a revolution. Upon the first one-eighth turn of this wheel, the motor 10 starts and this motor continues to operate for a predetermined period of time, at the end of which the solenoid 18 is energized by one of the limit switches so that the wheel 17 is turned the second eighth. During such turning, the motor circuit is broken and the motor comes to rest. When the solenoid 18 is again energized by the motor starting switch (26 in Fig. 4), the wheel 17 is turned the third eighth of a revolution and the motor then rotates reversely. When the other limit switch comes into play, again energizing solenoid 18, wheel 17 turns the fourth eighth of a revolution, again stopping the motor. The wheel 17 turns the other four-eighths of the revolution, when the mechanism is again operated to drive the motor first in one direction and then in the other.

The panel 13 carries four stationary contacts 27, 27$^a$, 27$^b$ and 27$^c$ which are spaced equi-distantly about and equi-distantly from the stub-shaft 23 as seen most clearly in Fig. 4. Co-operable with these four contacts, are two metal bridges 28 and 28$^a$ secured to the inner side of the wheel 17, the ends 29 of said bridges constituting contacts to engage said fixed contacts. Proper engagement may be insured by adjustment of nut 23$^a$. When the bridges 28 extend horizontally, their contacts 29 engage the contacts 27, 27$^a$, 27$^b$ and 27$^c$ and current is then supplied to the motor 10 to drive it in one direction. As soon as the wheel 17 is turned one-eighth of a revolution, the contacts 29 clear all of the contacts 27, 27$^a$, 27$^b$ and 27$^c$ so that the motor stops. When the wheel 17 is turned another eighth of a revolution, the bridges 28 are disposed vertically and the contacts 29 again engage all of the contacts 27, 27$^a$, 27$^b$ and 27$^c$, the current being then so fed to the motor 10 as to drive the latter reversely. When wheel 17 is again turned one-eighth of a revolution, the contacts 29 are again freed from engagement with the contacts 27, 27$^a$, 27$^b$ and 27$^c$ and the motor again comes to rest. The wheel 17 is now in position to again effect starting of the motor in the first mentioned direction, when said wheel is again turned.

The periphery of the wheel 17 is provided with a groove having circumferentially spaced shallow portions 31 and deep portions 32, and a contact ring 33 is secured in said groove, said ring having exposed contact portions 34 in the shallow groove portions 31 and intervening portions 34$^a$ sunk inwardly beyond the periphery of the wheel, in the deep groove portions 32. Fixed contacts 35 and 36 (preferably spring arms) co-act with the portions 34 of the contact ring 33, in forming additional switch means for a purpose hereinafter explained, said additional switch means being closed when the motor switch is closed and opened when the motor switch is opened.

Contact 35 is carried by a plate 37 secured to the panel 13. Contact 36 is secured to another contact 38 forming part of one of the limit switches, the corresponding contact of the other limit switch being shown at 39. These two contacts 38 and 39 are preferably formed by laterally bending the ends of a metal strip 40 which is secured to the panel 13. Below the strip 40 is another metal strip 41 upon which two upwardly diverging arms 42, 42$^a$ are pivoted. A spring 43 is employed to urge these arms inwardly toward each other, and stops 44 are provided to limit such inward swinging. The arm 42$^a$ carries a spring contact 45 for co-action with the contact 38, and the arm 42 carries a similar contact 45$^a$ to co-act with the contact 39. These arms 42 and 42$^a$, the contacts 45 and 45$^a$, the contacts 38 and 39, etc., constitute the two limit switches above mentioned. Their action is controlled by a limit switch controller 46 guided by a suitable guide 46$^a$ and caused to travel between the upper ends of the arms 42 and 42$^a$, by means of a screw 47, said screw being connected by appropriate gearing 48 with the motor 10, so that as the latter rotates to perform work, the controller 45 moves in one direction or the other, according to the direction in which the motor is being driven. Controller 46 is provided with two shoes 46$^b$ and 46$^c$ co-operable with the arms 42 and 42$^a$ respectively.

While the motor is rotating, the rotatable switch member 17 is in such position that the bridges 28 and 28$^a$ stand either horizontally or vertically, two of the contact ring portions 34 being then in contact with the fixed contacts 35 and 36. It thus follows that when the controller 46 swings one or the other of the arms 42 and 42$^a$, one of the limit switches closes. This completes a circuit through the solenoid 18, causing the latter to effect one-eighth rotation of the wheel 17. This moves the contacts 29 from the contacts 27, 27$^a$, 27$^b$ and 27$^c$ and the motor comes to rest. At the same time, the contact portions 34 of the ring 33, disengage from the contacts 35 and 36, again breaking the solenoid circuit. The wheel 17 now stands with the bridges 28 and 28$^a$ inclined, and as soon as switch 26 is again closed, solenoid 18 acts to again turn said wheel 17 an eighth of a revolution. This again brings the contacts 29 into engagement with the contacts 27, 27$^a$, 27$^b$ and 27$^c$, but in such position as to effect reverse driving of the motor 10. Also such turning of the wheel 17, brings two of the contact portions 34 of ring 33 into engagement with the contacts 35 and 36, so that when the other limit switch is operated, by the controller 46, current will flow through said parts 33, 35 and 36 to the solenoid 18. The latter being thus again energized, so turns wheel 17 as to again move the contacts 29 from engagement with the contacts 27, 27$^a$, 27$^b$ and 27$^c$, again bringing the motor to rest and again causing the contact portions 34 to break the solenoid circuit by disengaging from the contacts 35 and 36. Obviously, to start rotation of the motor in one direction, the switch 26 must be operated. After such starting, the switch may be released. Similarly, after the motor has rotated for the predetermined period of time in one direction and has cut off, it is necessary to again operate the switch 26 to start rotation of said motor in the reverse direction. After such starting, switch 26 may of course be released.

Any appropriate wiring may be used but that illustrated in Fig. 4 and given the reference numbers 50 to 70 inclusive in the following specific explanation of operation, may be considered as preferred. In that explanation, 50 and 59 denote opposite sides of a power line or other source, and the characters 14, 14$^a$, 14$^b$, 14$^c$, 15, 15$^a$, 15$^b$ and 15$^c$, merely denote binding posts to which the various wires are connected, said wires being to a large extent, if not totally, disposed behind the panel or base 13.

Assuming that the parts stand as seen in Fig. 1 and that the motor is to be driven, the operator closes the switch 26. Current then flows from one side 50 of the source, through 51, 15, 52, 15$^c$, 53, 26, 54, 15$^b$, 55, 56, 18, 57, 15$^a$, and 58, to the other side 59 of said source. This causes solenoid 18 to effect one-eighth revolution of wheel 17 so that 28 bridges between 27 and 27$^a$, and 28$^a$ bridges between 27$^b$ and 27$^c$ as seen diagrammatically in full lines in Fig. 4. Current then flows from 50 through 51, 15, 60, 14$^b$, 61, field of motor 10, 62, 14$^c$, 63, 27, 23, 27$^a$, 64, 14$^a$, 65, armature of motor 10, 66, 14, 67, 27$^b$, 28$^a$, 27$^c$, 68, 15$^a$, and 58, to 59. The motor 10 is thus driven and controller 46 starts to the right. As soon as shoe 46$^b$ clears arm 42 (almost at the same instant with motor starting) switch 26 may be opened, deenergizing solenoid 18 and allowing 19 and 24 to return to normal position in which the pawl 24$^a$ again engages a tooth of wheel 17 in readiness for the motor stopping operation. Motor 10 continues to rotate until shoe 46$^c$ of controller 46 depresses arm 42$^a$ to bring contact 45 against contact 38. (At this point, observe that simultaneously with positioning of bridges 28 and 28$^a$ as seen in full lines in Fig. 4, portions 34 of contact ring 33 were positioned against the contacts 35 and 36 as also seen in said figure.) When 45 strikes 38, current flows from 50 through 51, 15, 60, 14$^b$, 69, 37, 35, 33, 36, 38, 45, 42$^a$, 41, 70, 56, 18, 57, 15$^a$ and 58, to 59. This current flow energizes solenoid 18 causing it to effect a second eighth revolution of wheel 17. This not only moves the bridges 28 and 28$^a$ from the contacts previously engaged thereby to break the motor circuit, but moves the portions 34 of the ring 33 from engagement with the contacts 35 and 36, breaking the circuit of solenoid 18 and allowing 19, 24, and 24$^a$ to again return to normal. The next time switch 26 is closed, current flows again over the same path as described in connection with the prior closing of said switch, to energize solenoid 18, causing it to effect a third eighth revolution of wheel 17. In this position of the wheel, 28 bridges between 27$^a$ and 27$^c$ as dotted in Fig. 4, and 28$^a$ bridges between 27 and 27$^b$, as also dotted. It will also be observed that with the last explained turning of wheel 17, other portions 34 of ring 33 are brought into engagement with the contacts 35 and 36. Current now flows from 50 through 51, 15, 60, 14$^b$, 61, field of motor 10, 62, 14$^c$, 63, 27, 28$^a$, 27$^b$, 67, 14, 66, motor armature, 65, 14$^a$, 64, 27$^a$, 28, 27$^c$, 68, 15$^a$ and 58, to 59. Motor 10 thus rotates reversely, controller 46 starts back toward the position seen in Fig. 1, and switch 26 is opened as soon as sufficient time has been allowed to permit shoe 46$^c$ to clear arm 42$^a$.

Motor 10 continues to operate until shoe 46$^b$ causes arm 42 to engage contact 45$^a$ with contact 39. Then current flows from 50, through 51, 15, 60, 14$^b$, 69, 37, 35, 33, 36, 38, 40, 39, 45$^a$, 42, 41, 70, 56, 18, 57, 15$^a$, and 58, to 59. This energizes solenoid 18, causing it to rotate wheel 17 a fourth eighth revolution to free the bridges 28 and 28$^a$ from the contacts previously engaged thereby, thus stopping motor 10. Such wheel turning also moves the ring portions 34 from contact with the contacts 35 and 36, breaking the solenoid circuit and allowing 19, 24 and 24$^a$ to again return to normal. The parts then again stand as seen in Fig. 1, with the exception that the positions of bridges 28 and 28$^a$ have been interchanged, that is bridge 28 then occupies the position occupied by bridge 28$^a$ in Fig. 1, and vice versa, for the wheel 17 has been successively turned only four eighths of a revolution. During the turning of said wheel four eighths more of a revolution, the description above given will apply if 28 be substituted for 28$^a$ therein, and vice versa. The present application relates only to the general organization of elements, the rotatable switch 16 and limit switch being claimed in divisional applications.

We claim:—

In a controlling means for a reversible motor, a base, four fixed contacts carried by said base and spaced equidistantly about a common center, a wheel rotatably mounted on said common center, two bridges secured to said wheel and having their ends spaced apart equidistantly about said common center alternately bridge between and clear said fixed contacts as the wheel is turned step by step, a self-returning ratchet mechanism for turning said wheel one eighth revolution each time said ratchet mechanism is operated, a solenoid connected with said ratchet mechanism for operating the same, electrical connections between said fixed contacts and the motor for effecting motor-driving in one direction when said bridges are in one contact-engaging position and for effecting reverse motor-driving when said bridges arrive at their next contact-engaging position, a starting switch in circuit with said solenoid for energizing the latter to turn said wheel to a motor-driving position, current-conducting means carried by said wheel and having four contact portions spaced apart equidistantly about the wheel axis, two additional fixed contacts on said base positioned to be engaged by the last mentioned contact portions only when said wheel is in a motor-driving position and each time said wheel is in such a position, two limit switches, and electrical connections for establishing a circuit for said solenoid through said two additional contacts, through said wheel-carried current conducting means, and through either limit switch upon closing of the latter.

JOSEPH T. DESSUREAU.
ALLEN M. FLANDERS.